United States Patent Office 3,682,704
Patented Aug. 8, 1972

3,682,704
REDOX FUEL CELL REGENERATED WITH SUGAR
Richard Mackay Keefer, Toronto, Ontario, Canada, assignor to Electrocell Limited, Toronto, Ontario, Canada
No Drawing. Filed Feb. 5, 1970, Ser. No. 9,044
Int. Cl. H01m 27/00
U.S. Cl. 136—86 R          9 Claims

ABSTRACT OF THE DISCLOSURE

An electrochemical cell has an anodic half-cell which contains an oxidisable organic fuel, such as a sugar, and a redox couple, such as silver-argentous, the cell generating a current on interaction of the fuel and the redox couple whereby the fuel alone is consumed.

BACKGROUND OF THE INVENTION

This invention relates to electrochemical cells, of the type sometimes referred to as fuel cells, in which an organic substance is oxidized with the release of electrons, whereby an electric current is generated.

An electrochemical cell is generally divided into two compartments. In the first compartment, the anode comparment, there is contained an electrode to serve as the anode, and a solution in a suitable electrolyte of materials which undergo a chemical reaction accompanied by the release of electrons. In the second compartment, the cathode compartment, there is contained an electrode to serve as the cathode, and a solution in a suitable electrolyte of materials which undergo a chemical reaction accompanied by the capture of electrons from the cathode. The two compartments are separated by a suitable means to prevent excessive mixing of the two solutions. Charged ionic species are transported between the two compartments, to complete the electrical circuit.

It is an object of the present invention to provide a novel electrochemical cell.

It is a further object of the present invention to provide an electrochemical cell in which the fuel consumed is cheap, harmless and readily available.

It is a further object of the present invention to provide an electrochemical cell in which the anodic half-cell contains a secondary reductant and a primary reductant which interact, with the overall result that only the secondary reductant is consumed as a fuel.

Other objects and advantages will become apparent from the following description of the invention.

As used herein, the term "secondary reductant" means an oxidizable organic substance which is a reductant with respect to the oxidized species of the redox couple with which it is used in the anodic half cell. The term "primary reductant" refers to the metal or metal ion species present in the redox couple which is capable of undergoing electrochemical oxidation to a more highly oxidized form with the release of electrons, this more highly oxidized form being reducible with the secondary reductant to a less oxidized state.

As is well known, a redox couple is a pair of species of matter which have definite chemical compositions, which have a mutual component existing at different valence levels, which exhibit an electromotive force in proceeding from one species to the other, and which are substantially completely reversible in proceeding from one species to the other. Examples are silver-argentous, stannous-stannic, copper-cuprous-cupric and mercury-mercurous-mercuric.

SUMMARY OF THE INVENTION

The electrochemical cell of the present invention is characterized in that the anode compartment contains a solution of an oxidizable organic compound to act as fuel or secondary reductant, and a redox couple, one species of which acts as a primary reductant, which is capable of interaction with the fuel.

The present invention is based upon the discovery that certain redox couples in admixture with a suitable organic compound such as a reducing saccharide in the anode compartment of electrochemical cells can interact to give a steady generation of electric current for extended periods of time, without substantial net loss of the components of the redox couple, the less oxidized species of the redox couple acting as primary reductant. The cell seems to operate by having the redox couple components change from one species to another with the release of electrons to give electric current to an external circuit, and the reaction of the redox couple is reversed in situ to regenerate the first species (primary reductant) by interaction with the organic compound. The net result in the anode compartment is the chemical decomposition of the organic compound (secondary reductant), which is thus consumed in the manner of a fuel. The redox couple continues to operate to generate electric current without substantial net loss of its constituents, until all the oxidizable fuel has been consumed. The cathode compartment, it will be understood, contains a suitable reducible compound, preferably a regenerable reducible compound, and an electrode, and the two compartments are separated to prevent excessive mixing together of the contents of the two compartments.

DESCRIPTION OF THE PREFERRED EMBODIMENTS

Suitable, the organic fuel is a relatively easily oxidizable substance, such as a ketose or aldose saccharide, an alcohol, an aldehyde, a ketone or a carboxylic acid. The preferred organic fuels are saccharides such as glucose and sucrose.

The preferred redox couples for use in the present invention are those in which the metal itself participates as one of the species thereof. The anode which contacts the redox couple may be fabricated of the same metal as is participating in the redox couple. Apparently such an arrangement contributes to a higher current density than is otherwise achieved. Examples of such redox couples are silver-argentous, mercury-mercurous-mercuric, copper-cuprous-cupric, and combinations thereof. Other redox couples which are also useful include stannous-stannic and ferrous-ferric. Silver-argentous is the most preferred redox couple, silver being the primary reductant, and so for ease and clarity of description of what is believed to be the principle of operation of the anode side, or anode half cell, of the present invention, it will be further described with reference to these materials.

The primary reductant released in solution in an electrolyte will, under the influence of an oxidizing agent, readily become oxidized, e.g.

in an anode half cell. The oxidizing agent influence is derived from the presence of oxidizing agents in the cathode half cell. The reaction is accompanied by the release of electrons, which can be conveyed to an external circuit as an electric current.

The oxidized ions formed in this reaction interact with the secondary reductant by a mechanism which is not at present fully understood. The result of the reaction is the oxidation of the secondary reductant, with release of electrons, perhaps according to the following reaction scheme, when using a saccharide secondary reductant;

$$R_1CHO + H_2O \rightleftharpoons R_1CH(OH)_2$$
$$R_1CH(OH)_2 \rightarrow R_1COOH + 2H^+ + 2e^-$$
$$R_1COOH + H_2O \rightarrow R_2OH + CO_2 + 2H^+ + 2e^-$$
$$R_3CH_2OH \rightarrow R_3CHO + 2H^+ + 2e^-$$

and regeneration of primary reductant with capture of electrons released, e.g.

$$Ag^+ + e^- \rightarrow Ag$$

Thus it will be seen that in the anode compartment of the cell there are concurrently taking place at least three reactions. One is the oxidation of silver to argentous with release of electrons to an external circuit. The second is the oxidation of the secondary reductant with release of electrons. The third is the reduction of the argentous ions to silver with capture of electrons. It has been surprisingly discovered that these reactions appear to proceed in balance, resulting in a steady generation of electric current over long periods of time, without consumption of materials in the anode compartment other than the fuel.

It is desirable to ensure that all species of the redox couple are maintained highly soluble in the electrolyte being used, since the greater the concentration of metal ions in solution, the greater will be the current generated by the cell. To ensure this, it is in certain circumstances desirable to include complexing agents in the anodic half cell which will form highly soluble complexes with one or more of the redox couple species, and thereby maintain a high concentration of metal ions in solution. For instance when using a silver redox couple under basic conditions, it is highly desirable to include ammonia with the redox couple. This leads to the formation of the soluble argentous-ammine complex, and precludes the likelihood of argentous species precipitating as insoluble silver oxide.

Aldose and ketose saccharides have been found to be particularly desirable fuels in cells of the present invention. This is despite the fact that their oxidative processes appear to be complicated. They are relatively easily oxidized, and proceed through several stages of oxidation, accompanied by the release of at least one electron. This means they are extremely efficient as fuels in a fuel cell. For example, a monosaccharide such as glucose can undergo oxidation to a carboxylic acid in one stage, then to gluconic and glucaric acids and then oxidative chain scission may occur. Complete oxidative degration of glucose to carbon dioxide can be effected involving at least 10 oxidative stages. The inactive by-product which is formed is gaseous carbon dioxide, which can be readily removed as a gas and does not remain in the anode compartment solution to dilute it or to interfere with the reactions taking place. Alternatively, the carbon dioxide can be removed by absorption on reactants added to the anode half cell for this purpose. In addition, the saccharides are soluble in aqueous electrolytes, harmless, cheap and readily available.

Preferred as the secondary reductant (fuel) of the cell of the present invention are monosaccharides and low molecular weight, soluble polysaccharides. Polysaccharides such as starches and cellulose are also among the preferred fuels, these being generally converted into low molecular weight soluble polysaccharides and monosaccharides by hydrolysis within the cell. Most polysaccharides can be hydrolyzed by the use of acids (e.g. HCl), bases (e.g. NaOH) or enzymes as catalysts. The method of hydrolysis chosen in the cells of the present invention will depend to some extent upon any limitations imposed upon the desirable acidity of the electrolyte by other features of the cell.

Enzymes generally cause more rapid and efficient hydrolysis of polysaccharides, but are specific in their action, for example:

Amylase hydrolyzes starches such as amylose into maltose disaccharide units;

Cellobiase hydrolyzes cellobiose into glucose monosaccharide units;

Maltase hydrolyzes maltose into glucose monosaccharide units;

Invertase hydrolyzes sucrose into glucose and fructose monosaccharide units.

Additionally, cupric-ammine complexes, and in general transition metal-ammine complexes, hydrolyze cellulose to monosaccharides.

It is of course conceivable that such hydrolysis reactions take part in some way in the electrochemical, current generating reactions of the anode half cell. Whether or not this is so, these reactions do not appear to exert any serious, harmful influence on the generation of current by the cell.

It will thus be apparent that a very wide range of saccharide materials can be used as fuel in cells of the present invention. In addition to the common, readily available monosaccharides, such as glucose, polysaccharides such as cellulose and starches can be used. The cells of the present invention can be run on cellulose containing materials, preferably at least partially digested, such as wood pulp, and waste materials from the pulp and paper industry. Thus the cells of the present invention can be applied to processes of removal of cellulose wastes from water.

The electrode which is used as the anode in the anode compartment may be an inert electrode, such as graphite, or it may be a material which participates to some extent in the chemical reactions. In one preferred form of cell, the anode is constructed of the same metal which constitutes the ion of the redox couple, preferably amalgamated on its surface with mercury. Thus, when a cuprous-cupric redox couple is employed, the anode is suitably of copper, with mercury amalgam surfaces. When a silver-argentous redox couple is employed, the electrode may be of silver with a mercury amalgam surface. Then, the metal of the electrode participates in the redox couple. In general, the anode is selected with a view to its electrode potential with regard to the electrolyte in the anode compartment, and its chemical stability under conditions of use.

The electrolyte solution in the anode compartment can be acidic or basic in nature. In one embodiment of the cell, the electrolyte is a dilute ammonium hydroxide solution, the anode being silver sheet and the redox couple being silver-argentous. In such an arrangement, it is believed that the ammonia takes part in the reaction of the redox couple, by reacting with the argentous ions to form silver-ammine complex, which is retained in solution.

The means for separating the anode compartment from the cathode compartment is capable of considerable variation. It is suitably such that it will permit ion exchange but substantially no electron flow. Since the function of the separation means is to prevent mixing of the two solutions in the two compartments, it must of course be chosen with a view to its resistance to chemical attack on prolonged contact with the chemicals used in the electrolyte solutions. Porous, physical partitions such as porous pots which are commonly used in electrochemical cells are not suitable for use in the present invention. Since the saccharide used in one compartment is of much higher molecular weight than the inorganic oxidant in the other compartment, there is considerable osmotic pressure between the compartments. A membrane which will withstand such pressures and prevent mixing of the solutions as a result thereof should be chosen.

In accordance with one embodiment of the invention, the separation means comprises a membrane of the semipermeable type, which allows passage there-through of some of the charged species in the solutions. In this respect, thin sheets of plastic substances, such as polyethylene, polystyrene, polypropylene and the like can be used.

Cellulosic sheets such as suitably treated paper, cotton batts, and wood are also useful, always keeping in mind the requirement that the substance must not be liable to substantial chemical attack under conditions of use. The separaion means may be of a ceramic or vitreous nature, such as unglazed porcelain or sintered glass. In the alternative, the separation means may comprise a membrane of an ion exchange resin, or a salt bridge. In any event, the separation means is such that it prevents mixing of the solutions in the two compartments, whilst at the same time allowing a net transfer of electrical charge between the compartments, either by allowing flow of small ions between the compartments or by an ion exchange at the separation means.

The oxidant solution which is contained in the cathode compartment of the cell of the present invention may be generally of conventional form. Preferably it is an oxidant which is regenerable in situ, by contact with atmospheric oxygen. Suitable examples are aqueous solutions of ferric nitrate and nitric acid, aqueous solutions of cupric nitrate and nitric acid, and aqueous solutions of silver hydroxide, ammonia, sodium hydroxide and sodium carbonate.

The material from which the cathode electrode is constructed, which contacts the oxidant solution, is chosen having regard to its electrode potential with respect to the electrolyte being used in that compartment, and its chemical inertness to the electrolyte. Graphite is an example of a suitable such material for the cathode.

The cell of the present invention may also include in one or each compartment, trace amounts of other compounds to act as depolarizers.

The invention will be further described with reference to specific examples.

EXAMPLE 1

An electrochemical cell according to the invention was constructed of two compartments, and operated at S.T.P., using sucrose as a reduction. The sucrose was employed as a 30% aqueous solution, along with 10% hydrochloric acid (used both to hydrolyze the sucrose and as an electrolyte) and 5% cupric chloride, $CuCl_2$, to serve as the redox couple "catalyst" in the consumption of the sucrose fuel. The anode was of porous graphite.

The oxidant, in the cathode compartment of the cell was a 20% aqueous solution of ferric nitrate $Fe(NO_3)_3$, with 2% $CuCl_2$. The cathode was copper, with a coating of electroplated copper-black. The partition between the compartments was a membrane consisting of leached, fine-grained wood.

The cell initially polarized at +0.75 v. (at 20 ma./inch² of cathode), but as the hydrolysis of the sucrose proceeded, the voltage soon rose to +1.25 to 1.30 v. (at 40 ma./inch² of cathode).

EXAMPLE 2

Example 1 was repeated, with the following modifications: the operating temperature was increased to 140° F.; the concentration of the sucrose was increased to 50%; and the wooden membrane was replaced by one of unglazed porcelain.

The cell initially polarized at +1.20 v. (at 40 ma./inch² of cathode); however, polarization of the cell soared to 2.05 v. (at 65 ma./inch² of cathode), perhaps as a result of the increased rate of hydrolysis of the sucrose.

EXAMPLE 3

In this example, cotton wads saturated with the reactant solutions were used in both half cells. The anode half cell used a copper screen amalgamated on its surface with mercury as the anode electrode. The anolyte solution contained copper ions at a concentration of about 5 molar, and glucose at a concentration of about 5 molar initially, in aqueous ammonium hydroxide. The membrane used was Union Carbide dry cell plasticized paper. The catholyte (oxidant) solution contained "silver hydroxide," sodium carbonate and sodium hydroxide in ammonium hydroxide aqueous solution, the concentration being about 10 molar with respect to hydroxyl. The cathode was of graphite. The cell was of sandwich-like construction, with the anode contacting the cotton wad saturated with reductant, which in turn contacted the membrane, which in turn contacted the cotton wad saturated with oxidant solution. The cathode contacted the oxidant solution saturated cotton wad.

Initially the cell polarized at 0.79 volt, generating a current of 150 milliamps. After 4 hours, the voltage had dropped to 0.72 volt and the current to 65 milliamps. The cell was thereupon recharged by addition of concentrated glucose solution, to restore the concentration of glucose in the anode solution to about 5 molar. The voltage was by this means restored to 0.76 volt and the current to 135 milliamps. After a further 4 hours continuous use, the voltage and current had again fallen, but was restored to the same values of voltage and current by recharging glucose to restore the 5 molar concentration thereof.

EXAMPLE 4

This example illustrates the use of a silver redox couple in the anode compartment of a wet cell, with glucose secondary reductant.

The cell was of H-shape cross section, having a pair of vertically disposed tubes connected by a transverse tube. Approximately midway along the transverse tube was disposed a sintered glass disc as separating means. The anode compartment contained a silver screen, in tubular form, as electrode, and an aqueous solution containing glucose (1 molar), silver nitrate (0.2 molar), and ammonium hydroxide (0.25 molar). The pH of this solution was 10.0. The cathode compartment contained a graphite rod electrode and an aqueous solution of ferric nitrate, having a pH of 1.4.

This cell initially polarized at a voltage of 0.63 vol, generating a short circuit current of 4 milliamps. After about 4 hours, the current steadied at 3.3 milliamps, the voltage at 0.45 volt. The cell was regenerable by addition of further glucose. After prolonged use, some silver metal had deposited elsewhere in the anode compartment, but no overall loss in silver metal had taken place. This indicates clearly that the silver is acting in a reversible redox reaction, but is being regenerated in situ, the only material being consumed being the sugar. Improvements in cell design can be made, to prevent deposition of silver metal elsewhere in the anode compartment, and ensure that all silver metal deposited as a result of the redox reaction is collected on the silver anode.

What I claim as my invention is:

1. An electrochemical cell utilizing a sugar as a fuel, said cell having an anode compartment, a cathode compartment and an ion permeable separation means therebetween retarding the mixing of solutions between said anode and cathode compartments, the anode compartment containing an anode of copper amalgamated with mercury and an aqueous anolyte solution, and anolyte solution having dissolved therein a sugar and a redox couple comprising a soluble copper salt, said amalgamated copper being regenerable by said sugar, the cathode compartment containing a cathode of graphite and an aqueous catholyte solution having dissolved therein silver hydroxide, ammonuim hydroxide, sodium hydroxide and sodium carbonate, and means for contacting said catholyte solution with air.

2. An electrochemical cell utilizing a sugar as a fuel, said cell having an anode compartment, a cathode compartment and an ion permeable separation means therebetween retarding the mixing of solutions between said anode and cathode compartments, the anode compartment containing an anode of graphite and an aqueous anolyte solution having dissolved therein a sugar and a redox couple comprising a soluble copper salt, the cathode compartment containing a cathode of copper and an aqueous catholyte solution having dissolved therein ferric nitrate along with copper chloride, and means for contacting said catholyte solution with air.

3. An electrochemical cell utilizing a sugar as a fuel, said cell having an anode compartment, a cathode compartment and an ion permeable separation means therebetween retarding the mixing of solutions between said anode and cathode compartments, the anode compartment containing an anode of silver and an aqueous anolyte solution having dissolved therein a sugar and a redox couple comprising a soluble silver salt and ammonium hydroxide, the cathode compartment containing a cathode of graphite and an aqueous catholyte solution containing ferric nitrate, and means for contacting said catholyte solution with air.

4. An electrochemical cell utilizing a sugar as a fuel, said cell having an anode compartment, a cathode compartment and an ion permeable separation means therebetween retarding the mixing of solutions between said anode and cathode compartments, said anode compartment containing an anode consisting essentially of graphite, amalgamated copper, silver, or combinations thereof, a redox couple selected from the group consisting of silver argentous, mercury-mercurous-mercuric, copper-cuprous-cupric and mixtures thereof and an aqueous anolyte solution having dissolved therein a sugar and a soluble species derived from said redox couple, said redox couple having an oxidized state which is reducible by said sugar in said anolyte solution and a reduced state which is oxidized under cell operating conditions with the release of electrons, said cathode compartment containing a cathode and an aqueous catholyte solution having dissolved therein a redox couple reducible in said catholyte solution by capture of electrons from said cathode and oxidizable by contact with air and means for contacting said catholyte solution with air.

5. An electrochemical cell as defined in claim 4 wherein the sugar is glucose.

6. An electrochemical cell as defined in claim 4 wherein the sugar is sucrose.

7. An electrochemical cell as defined in claim 4 wherein the anode is constructed of the same metal as is present in the soluble species of the redox couple of the anolyte solution.

8. An electrochemical cell as defined in claim 4 wherein the cathode is constructed of graphite.

9. An electrochemical cell as defined in claim 4 wherein the cathode is constructed of copper.

References Cited

UNITED STATES PATENTS

| | | | |
|---|---|---|---|
| 3,216,861 | 11/1965 | Cohn et al. | 136—86 |
| 3,284,239 | 11/1966 | Hunger et al. | 136—86 |
| 3,360,401 | 12/1967 | Grasselli et al. | 136—86 |
| 3,279,950 | 10/1966 | Kordesch et al. | 136—86 E |

OTHER REFERENCES

Status Report on Fuel Cells PB–151804, by B. R. Stein, June 1959, pp. 60–62.

ALLEN B. CURTIS, Primary Examiner

H. A. FEELEY, Assistant Examiner

U.S. Cl. X.R.

136—86 E